United States Patent

Yap et al.

[11] Patent Number: 6,019,830
[45] Date of Patent: *Feb. 1, 2000

[54] COLD APPLICATION, FLY ASH AQUEOUS COLLOIDAL DISPERSION DRIVEWAY SEALERS

[75] Inventors: Michael L. Yap, Oldsmar; Raymond T. Hyer; Barton J. Malina, both of Tampa, all of Fla.

[73] Assignee: Gardner Asphalt Corporation, Tampa, Fla.

[*] Notice: This patent is subject to a terminal disclaimer.

[21] Appl. No.: 08/801,844

[22] Filed: Feb. 18, 1997

[51] Int. Cl.[7] .............................. B01J 13/00; C08L 95/00
[52] U.S. Cl. ........................... 106/277; 106/DIG. 1; 516/47; 516/50; 516/52
[58] Field of Search ............... 252/311.5; 106/277, 106/DIG. 1; 516/47, 50, 52

[56] References Cited

U.S. PATENT DOCUMENTS

| | | | |
|---|---|---|---|
| 2,670,332 | 2/1954 | McCoy et al. | 516/47 X |
| 3,206,319 | 9/1965 | Minnick et al. | 106/277 X |
| 3,819,556 | 6/1974 | Morisawa | 106/DIG. 1 |
| 4,450,011 | 5/1984 | Schilling et al. | 106/277 X |
| 4,778,527 | 10/1988 | Ikunaga et al. | 106/283 X |
| 5,173,115 | 12/1992 | Glynn, Jr. et al. | 106/277 X |
| 5,573,586 | 11/1996 | Yap et al. | 106/668 |

*Primary Examiner*—Richard D. Lovering
*Attorney, Agent, or Firm*—Stein, Schifino & Van Der Wall

[57] ABSTRACT

Aqueous colloidal dispersion driveway sealer compositions especially adapted for cold application are made available through the controlled utilization of fly ash.

2 Claims, No Drawings

COLD APPLICATION, FLY ASH AQUEOUS COLLOIDAL DISPERSION DRIVEWAY SEALERS

BACKGROUND OF THE INVENTION

1. Field of the Invention

This invention relates to cold application colloidal dispersion asphalt and coal tar compositions containing controlled amounts of fly ash, to provide requisite formulation viscosity, and cold application properties as driveway sealers.

2. Background of the Invention

Regardless of specific compositions of driveways, repairs are frequently needed especially in high rain areas, sunny regions, and those having freeze-thaw cycles. Cold application formulations are especially desirable because they enable the "do it yourself" user to avoid labor costs. The dry film toughness and color uniformity have been an ongoing concern in cold application formulations. The use of inert fillers in the formulation to improve deficiencies have been tried. However, additional cost, color and viscosity inconsistency in the finished product are encountered.

PRIOR ART

The use of asphalts, coal tar, and fillers as components in sealer compositions is broadly old. See e.g. U.S. Pat. Nos. 5,019,168 and 5,340,391. None disclose, however, the particular formulations and advantages of this invention, and particularly, the desired controlled use of fly ash.

SUMMARY OF THE INVENTION

It has now surprisingly been found that the controlled use of fly ash can provide toughness, color uniformity, enhanced viscosity and economically superior cold application aqueous colloidal dispersions for driveway sealers. It is indeed surprising that controlled use of readily available, and by product material, fly ash, can be utilized to overcome the deficiencies of existing formulations. Compositions of this invention thus comprise fly ash; water; at least one of asphalt or coal tar, in aqueous emulsion; and preferably sand.

DETAILED DESCRIPTION OF THE PREFERRED EMBODIMENT

Fly ash is a very fine-grained residue that is obtained from the combustion of powdered or ground coal and/or other natural sources. It accumulates in the electrical or mechanical dust collecting system which is connected to the steam generator of power plants.

The particle size utilized is in the range of about 5–80 microns and conform in general to specifications outlined by ASTM C618. The fly ash is utilized in an amount to impart a viscosity in the range of about 500–500,000 centipoise.

The asphalt and coal tar in this invention can be of any of the well-known bituminous substances.

Asphalt is derived from a number of materials such a for example, petroleum, shale oil, gilsonite and the like. Asphalt is a thick, viscous mixture of compounds such as, for example, paraffinic, cycloaliphatic and aromatic hydrocarbon and lesser amounts of heterocylic compound containing sulfur, nitrogen or oxygen. Although asphalt can be obtained from natural sources it is primarily derived as the residue of petroleum distillation (e.g. the bottom product of a vacuum distillation of a topped crude). Although this invention is not limited thereto, it is preferred that the asphalt have a penetration (ASTM D5) at 77 degrees F. dmm: ranging from about 5 to about 300 dmm and more preferably from about 50 to about 200 dmm and conform in general to specification outlined by ASTM D312, D946 and/or D449.

The asphalt is utilized in the form of an aqueous emulsion readily available in the trade, see ASTM D1227, type 3 and 4, and thus has a water content of about 45–55 wt. %. Other aqueous asphalt emulsions can be employed such as AASHTO M208/ASTM D2397 and AASHTO M140/ASTM D 977, which have a water content of about 30–60 wt. %. Inverted apshalt emulsions, also known as water-in-oil asphalt emulsions, and which have a water content of about 30–70 wt. %, can also be employed.

Coal tar is derived from crude coal tar, water gas tar, oil gas tar or from combination of such tars with their constituents. Coal tar is a black, viscous naphthalene—like odor, amorphous residue mainly from distillation of coal. The majority of its composition is polynuclear aromatic compounds such as aromatic hydrocarbon, naphthalenic, phenolic, anthracenic, quinolinic compound with trace of insoluble materials. Different grades have different float tests and softening points. Although this invention is not constrained to, the preferred coal tars have a float test at 122 degree F., seconds: ranging from about 75 to about 230 seconds and more preferably from about 180 to 220 seconds and conform in general to specification outlined by RT-10 (Road Tar-10) RT-11 and RT-12 in ASTM D490.

The coal tar is utilized in the form of an aqueous emulsion readily available in the trade (see Federal Specification RP 355e) and thus has a maximum water content of about 53 wt. %.

At least one of the aqueous emulsions of asphalt and coal tar are employed, depending on desired final product specifications, customer preference, and regional availability. The term at least one also is inclusive of both.

Sand is a well-known material and is obtained from natural occurring or crushed silica quartz mineral, or slag.

Other optional ingredients can be added as follows.

The term polymer emulsions connotes trade available water based colloidal dispersions manufactured by a polymerization process of either acrylic polymer(s), or styrene polymer(s), or acrylonitrile polymer(s), or vinyl polymer(s), or combination of two, three, or four of the above polymers. Polymer emulsions can enhance cohesion and viscosity in aqueous dispersion driveway sealers.

Thickening agents, cellulosic and polysaccharide, can be used to enhance product applicability and homogeneity. Non-cellulosic thickeners such as clays, (including attapulgite, bentonite and others), polyacrylic acids, polyacrylates and associated thickeners can also be used. Other additives can be used to impart further specifically desired custom properties. Examples of these additives are PH adjusters which promote long term product stability.

It should be noted that the amount of "water" listed below is in addition to that derived from the asphalt and coal tar aqueous emulsions; and that the amount of either asphalt or coal tar emulsions listed below can be zero as explained above.

Subject to the foregoing, the ranges of components are about:

| Parts by Weight % (Based on Total Composition) | |
| --- | --- |
| Water | 0.0–30.0 |
| Fly Ash | 0.1–40 |
| Asphalt, Coal Tar Emulsion | 5.0–80 |
| Thickening Agents | 0.0–3 |
| Polymer Emulsions | 0.0–10 |
| Sand | 0.0–40 |
| Additives | 0.0–10 |
| Total | 100 |

The preferred formulation is about:

| Parts by Weight % (Based on Total Composition) | |
| --- | --- |
| Water | 10–25 |
| Fly Ash | 0.5–20 |
| Asphalt, Coal Tar Emulsion | 10–50 |
| Thickening Agent | 0.0–1.0 |
| Polymer Emulsion | 0.0–5.0 |
| Sand | 10–30 |
| Additives | 0.0–3.0 |
| Total | 100 |

The preferred method of formulation is admixture in conventional mixing equipment utilizing first water, followed by fly ash, coal tar and/or asphalt emulsion, polymer emulsion, thickening agent, sand and additives for custom attributes. The product is removed when the desired viscosity is obtained.

The method of applying the compositions of this invention to driveways is using a brush, squeegee, roller, spray or other similar task specific applicator.

The invention will be readily understood by reference to the following examples.

EXAMPLE 1

An aqueous colloidal dispersion driveway sealer for cold application was prepared consisting of water, fly ash, emulsified asphalt emulsion, coal tar, thickening agent, polymer emulsion and silica sand. The composition resulted in a very consistent viscosity, high shelf life, was easy to apply and very durable sealer.

The composition was:

| Parts by Weight % Based on Total Composition | |
| --- | --- |
| Water | 25 |
| Fly Ash | 20 |
| Coal Tar Emulsion | 10 |
| Asphalt Emulsion | 30 |
| Thickening Agent | 1 |
| Polymer Emulsion | 2 |
| Sand | 12 |
| Total | 100 |

EXAMPLE 2

An aqueous colloidal dispersion driveway sealer for cold application was prepared consisting of water, fly ash, emulsified coal tar, thickening agent, polymer emulsion, and silica sand. The composition resulted in a very durable sealer, that is oil and gasoline resistant, is easy to apply and has excellent shelf life.

| Parts by Weight % Base on Total Composition | |
| --- | --- |
| Water | 25 |
| Fly Ash | 20 |
| Coal Tar Emulsion Concentrate | 40 |
| Thickening Agent | 1 |
| Polymer Emulsion | 2 |
| Sand | 12 |
| Total | 100 |

EXAMPLE 3

An aqueous colloidal dispersion driveway sealer for cold application was prepared consisting of water, fly ash, emulsified asphalt, thickening agent, polymer emulsion, and silica sand. The composition resulted in a very durable sealer, easy to apply, with an excellent shelf life.

The composition was:

| Parts by Weight % Base on Total Composition | |
| --- | --- |
| Water | 25 |
| Fly Ash | 20 |
| Asphalt Emulsion | 40 |
| Thickening Agent | 1 |
| Polymer Emulsion | 2 |
| Silica Sand | 12 |
| Total | 100 |

EXAMPLE 4

Aqueous colloidal dispersion driveway sealers for cold application were prepared consisting of water, various amounts of fly ash, emulsified coal tar and asphalt, thickening agent, polymer emulsion and silica sand. When fly ash was utilized at or greater than 45 percent by weight, the compositions showed premature cracking (mud cracks), loss of cohesion and adhesion, and discoloration.

| Parts by Weight % Based on Total Composition | |
| --- | --- |
| Water | 15 |
| Fly Ash | 45 |
| Coal Tar Emulsion | 9 |
| Asphalt Emulsion | 20 |
| Thickening Agent | 1 |
| Polymer Emulsion | 2 |
| Silica Sand | 8 |
| Total | 100 |

The advantages of this invention will be apparent to the skilled in the art. The use of the fly ash provides improved durability and film toughness, desired viscosity, lowers requirements for expensive thickening agents, results in a smoother sealer, with less discoloration. This is accomplished with easier mixing and application, recycling of a waste product, and results in reduced costs.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. An aqueous colloidal dispersion driveway sealer film composition especially adapted for cold application consisting essentially of water, at least one of asphalt, and coal tar emulsions, fly ash particles in a size of about from 5–80 microns, and in an amount to impart a viscosity in the range of about 500 to 500,000 centipoise to the entire composition; the parts by weight of the components being about

|  | Parts by Weight % (Based on Total Composition) |
|---|---|
| Water | 0.0–30.0 |
| Fly Ash | 0.1–40 |
| Asphalt, Coal Tar Emulsion | 5.0–80 |
| Thickening Agents, other than fly ash | 0.0–3 |
| Polymer Emulsions | 0.0–10 |
| Sand | 0.0–40 |
| Additives | 0.0–10 |
| Total | 100. |

2. The composition of claim 1 containing the following components:

|  | Parts by Weight % (Based on Total Composition) |
|---|---|
| Water | 10–25 |
| Fly Ash | 0.5–20 |
| Asphalt, Coal Tar Emulsion | 10–50 |
| Thickening Agent, other than fly ash | 0.0–1.0 |
| Polymer Emulsion | 0.0–5.0 |
| Sand | 10–30 |
| Additives | 0.0–3.0 |
| Total | 100. |

* * * * *